INVENTOR.
WILLIAM N. POUNDSTONE
HIS ATTORNEY

Oct. 10, 1961    W. N. POUNDSTONE    3,003,432
RAILWAY CAR TRUCK
Filed Aug. 31, 1959    3 Sheets-Sheet 3
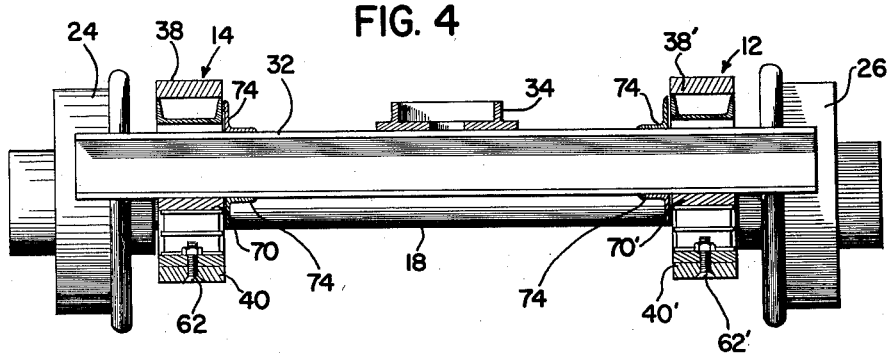
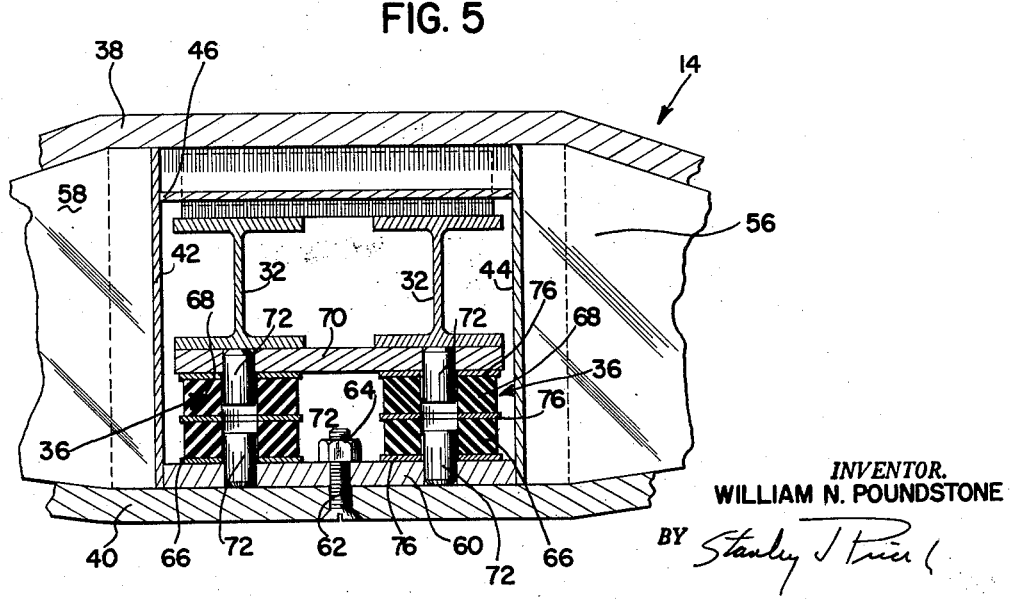
INVENTOR.
WILLIAM N. POUNDSTONE
BY
HIS ATTORNEY

United States Patent Office 3,003,432
Patented Oct. 10, 1961

3,003,432
RAILWAY CAR TRUCK
William N. Poundstone, Morgantown, W. Va., assignor to Consolidation Coal Company, Pittsburgh, Pa., a corporation of Pennsylvania
Filed Aug. 31, 1959, Ser. No. 837,087
4 Claims. (Cl. 105—182)

The present invention relates to a railway car truck and more particularly to an improved truck for use in confined spaces such as the passages within coal mines.

In general, railway car trucks are of two types. One type has its wheels non-rotatably fixed to its axles so that two wheels and an axle rotate as a unit. A second type has its wheels fixed to rotate relative to the axles so that each wheel rotates with respect to the axle that supports it. In trucks that have the wheels fixed to the axle and in which the axle and wheels rotate as a unit, the unitary construction of the axles and wheels tends to maintain the axle perpendicular to the rails upon which the truck moves. Because the axles tend to be maintained perpendicular to the rails, the wheels do not ride toward one rail or the other. Accordingly, there is very little flange wear on the wheels of this type of railway car. By flange wear is meant the wear that occurs when the axles of the railway car are moved out of a perpendicular relationship with the rails thus causing the flanges on the wheels to rub the sides of the rails as the car moves down the track. This flange wear is very expensive in that it requires premature replacement of the railway truck wheels.

Even though the unitary wheel and axle construction of railway trucks which have the wheels fixed to the axles reduces the amount of flange wear, this type of truck is not in general service in coal mines. The railway track within a coal mine must often be laid so that there are relatively short radius turns to be negotiated by the cars on the track. The fixed wheel-to-axle type railway truck is not able to negotiate a very short radius turn since the two wheels must travel at the same speed and, therefore, cover approximately the same distance. The difference in distance covered by the two wheels is limited to an amount that may be compensated for by the variance in wheel radius caused by the taper of the wheel. A truck with wheels that are free to rotate relative to the axle, on the other hand, is able to negotiate a short radius turn.

Further, many of the fixed wheel-to-axle trucks support the axles outboard of the wheels which makes for a truck of increased width. This is very undesirable in the confines of mine passages. Since the wheels of the fixed wheel-to-axle type trucks are usually press fitted onto the axles, replacement or maintenance of the wheel units and bearings is difficult since a wheel puller must be utilized to pull the wheels or else the entire wheel-axle unit must be removed. These disadvantages of maintenance are particularly aggravated in the relatively cramped conditions often prevailing in coal mines. The construction of this type of truck makes replacement of the wheels and axles difficult. Accordingly, while the fixed wheel-to-axle construction of this type of truck does not result in flange wear on the wheels, other factors dictate that this type of truck not be utilized in mine service.

When the wheels of a rail car truck rotate relative to their respective axles, the self-aligning tendencies of the fixed wheel-to-axle construction are not present. That is, the axles of this type of rail car truck do not tend to maintain themselves in a perpendicular relationship to the rails as do the axles that have wheels non-rotatably fixed to them. Thus, since the axles do not naturally maintain themselves in perpendicular relationship to the rails, a great deal of flange wear occurs on the wheels if the axles are not forcefully maintained in this relationship. As stated previously, this flange wear has become a major economic factor since flange wear requires premature replacement of the rail car truck wheels. Since rail car trucks with wheels that rotate relative to their axles are most prevalent in mining operations today, some means must be provided for keeping the axles of this type of rail car trucks in a perpendicular relationship to the rails when the axles and rails are viewed from the top of the truck.

Although there is a requirement for keeping the axles perpendicular to the rails, all the axles and side beams of a rail car truck may not be rigidly fixed to each other. Some provision must be made for allowing the wheels of the truck to move individually in a vertical direction to compensate for unevenly laid rails. When railroad track is laid, particularly in the relatively rugged terrain conditions that occur in a coal mine, it often happens that the two rails of the railway track are not maintained in the exact same horizontal plane throughout the extent of the track. Thus one rail may dip below or rise above the other rail. To prevent the possibility of derailment of the rail car truck by one wheel skipping the track at a low spot, some provision must be made for vertical movement of the individual wheels with respect to each other so that they may follow the track.

From the foregoing discussion it may be seen that a two-fold problem presents itself. Primarily the axles of the railway car truck must be maintained in perpendicular relationship to the rails upon which the truck rides when the axles and rails are viewed from the top of the truck. Secondly, the individual wheels of the railway car truck must be allowed some vertical movement relative to each other so that they may follow rough, uneven track.

It is well known in the rail car truck art to provide vertical wheel movement so that cars may follow rough uneven track. There are many examples of the railway car truck which provide vertical movement of the wheels. These railway car trucks are ones in which the wheels are rigidly fixed to rotatable axles so that there is no inherent misalignment problem between the axles and the rails. Thus, they do not meet and solve the two-fold problem of providing rigid axle alignment in perpendicular relation to the rails, and, at the same time, allowing vertical movement of the individual wheels. So far as is known, no rail car truck until that of the present invention has solved the problem of providing rigid axle alignment to reduce wheel flange wear by maintaining the axles in perpendicular relationship to the rails, and, at the same time, allowing vertical movement of the wheels with respect to each other.

The rail car truck of the present invention has met and solved this two-fold problem. This invention contemplates a railway car truck constructed in two rigid, unitary sections. These sections are joined by universal connecting means at diagonally opposite points on the generally rectangular railway car truck. Each of the unitary sections consists of one axle and one side beam rigidly and non-rotatably fixed to each other. In the unitary sections, there can be no relative movement whatsoever between the axle and its respective side beam. Therefore, there can be no wear between the axle and the side beam which might destroy the preset and accurately fixed relation between the axle and the side beam of such unitary section. The universal connecting means joining the two unitary sections at diagonally opposite points allows for vertical movement of the wheels with respect to each other so that they may follow an uneven railway track. Even with this universal connecting means, the two unitary sections when viewed from the top of the truck maintain the axles of the rail car truck in perpendicular relationship with the rails upon which the truck moves.

With the foregoing considerations in mind it is an object of the present invention to provide a railway car truck with freely rotating wheels that provides for vertical movement of the individual wheels and at the same time maintains the axles of the truck perpendicular to the rails to reduce flange wear on the wheels.

It is another object of the present invention to build a car truck in two unitary sections connected by universal connecting means so that the car is maintained in a rigid perpendicular condition when viewed from its top and at the same time, provision is made for vertical movement of the individual wheels.

It is a further object of the present invention to construct a rail car truck in which one axle and one side beam of the truck are rigidly nonrotatably fixed to each other and in which the other axle and the other side beam are rigidly and nonrotatably fixed to each other so that no relative motion and therefore no wear can occur between the axle and its respective fixed side beam.

These and other more specific objects of the present invention will become apparent from a review of the following description taken in conjunction with the attached drawings.

In the drawings:

FIGURE 4 is a sectional elevation taken along line 4—4 of FIGURE 2.

FIGURE 5 is a partial section taken along line 5—5 of FIGURE 2 showing certain details of the bolster mounting means.

With reference now to the drawings in which like reference numerals refer to like parts in all figures, the construction and operation of the present invention will be described in some detail.

Figure 1:
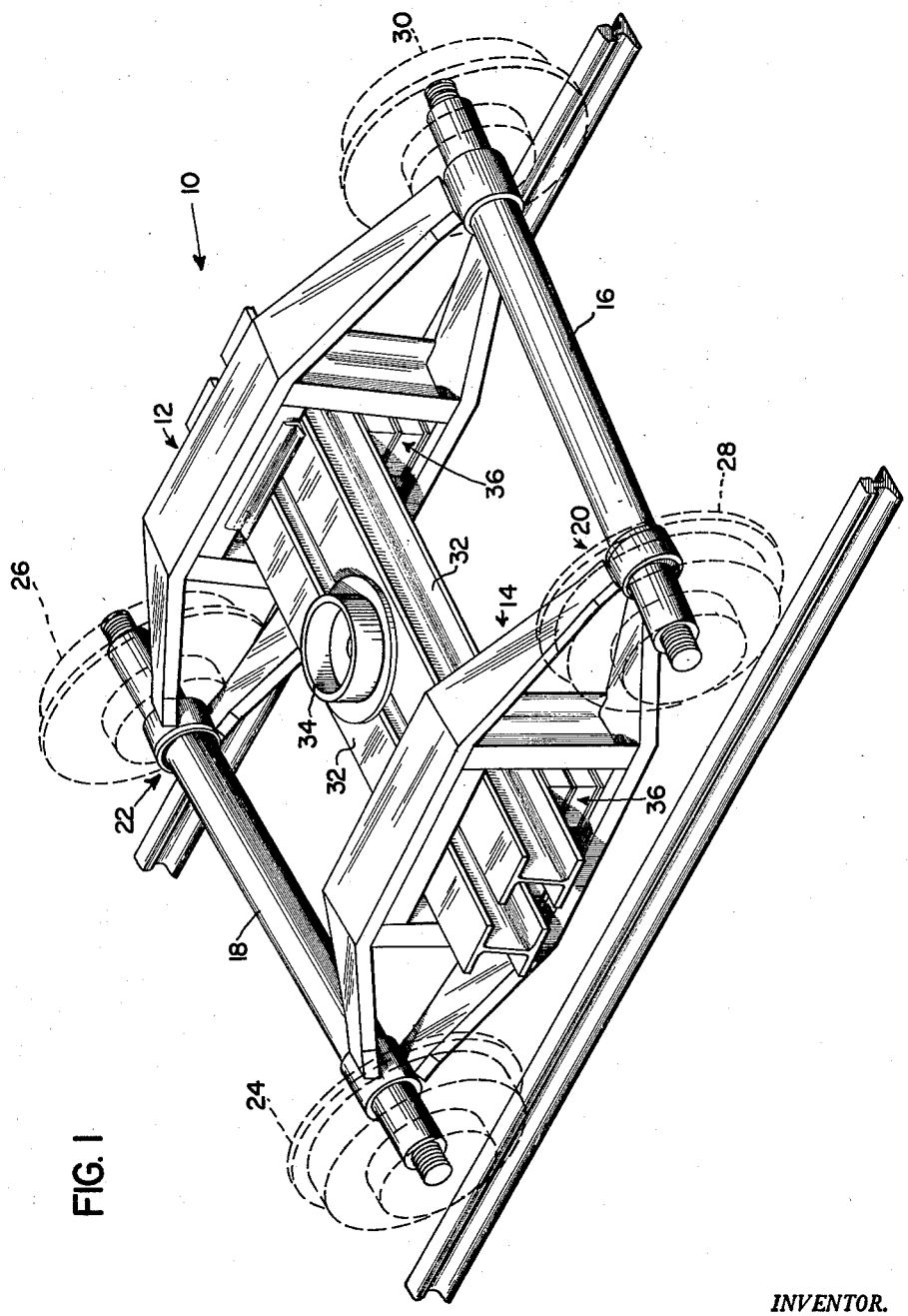
FIGURE 1 is a perspective view of a car truck built in accordance with the present invention.

FIGURE 1 is a perspective view of the novel rail car truck 10 which is formed generally of the longitudinally extending side beams 12 and 14 and transversely extending axles 16 and 18. The side beam 12 and the axle 16 are rigidly and nonrotatably secured to each other to form one unitary section. The side beam 14 and the axle 18 are rigidly and nonrotatably secured to each other to form the other unitary section. The two unitary sections are joined to each other by universal connecting means 20 and 22. Universal connecting means 20 secures axle 16 to side beam 14, and universal connecting means 22 secures axle 18 to side beam 12. Journaled for relative rotation on the protruding ends of axles 16 and 18 are flanged wheels 24, 26, 28 and 30.

Two bolster beam means in the form of I beams 32 are supported by the side beams 12 and 14. The bolster beams 32 support the car bolster 34 which is generally cylindrical in form and which rotatably receives a depending member rigidly attached to the railway car (not shown). The bolster 34 is conventional in form and is attached to the bolster beams 32 in any suitable manner. The bolster beams 32 are supported on the side beams 12 and 14 by resilient bolster supports 36.

Referring to FIGURES 2, 3, 4 and 5, the specific construction of the railway car may be seen in more detail.

Figure 2:
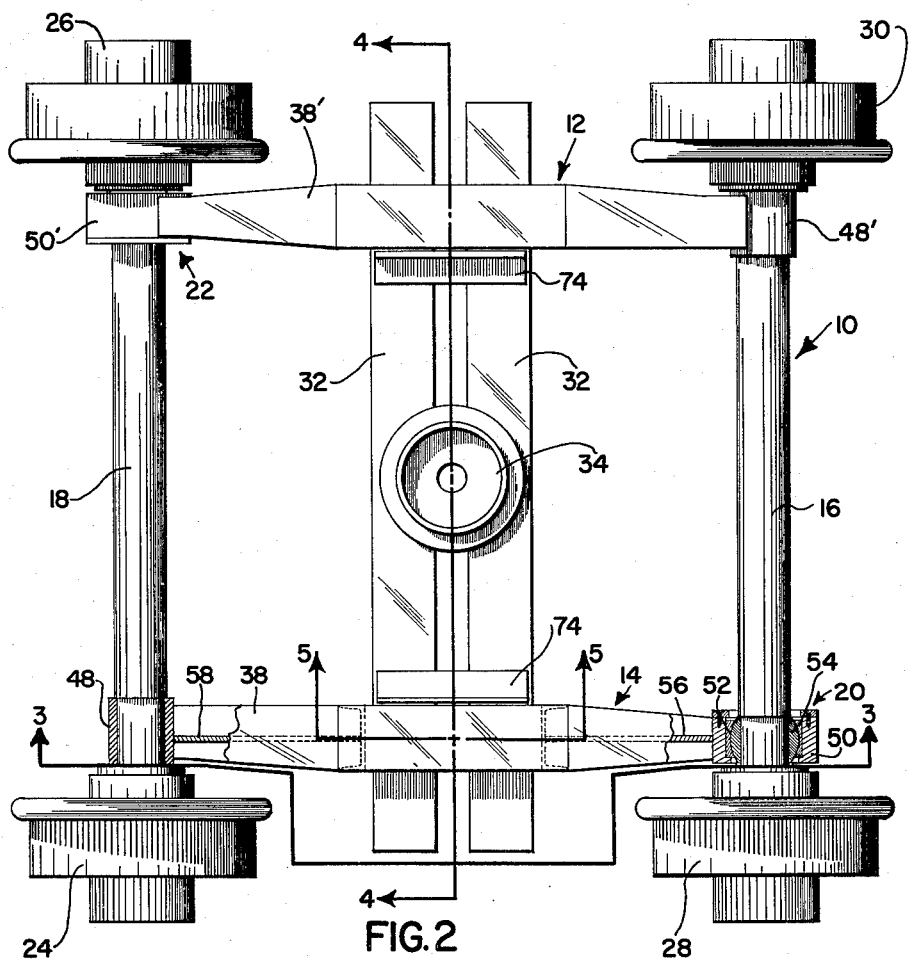
FIGURE 2 is a top plan view of the truck of FIGURE 1.
Figure 3:
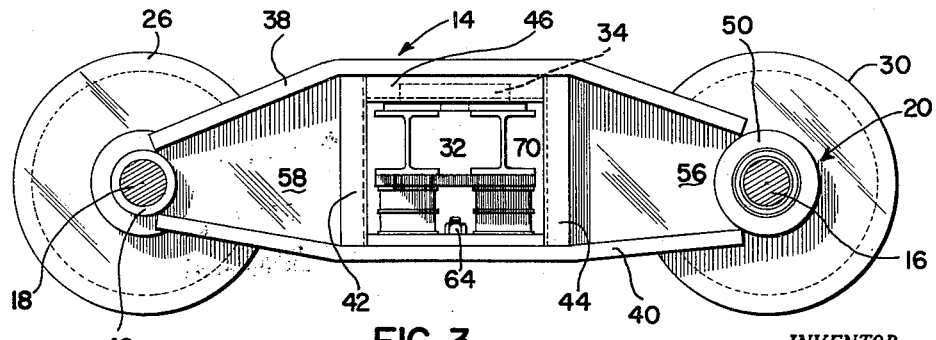
FIGURE 3 is a side elevation, partly in section, of the truck of FIGURES 1 and 2 taken along line 3—3 of FIGURE 2.

As seen in FIGURES 2 and 3, the side beams 12 and 14 are identical in construction and may be fabricated from standard metal stock. The construction of side beam 14 will be described in detail. However, since the construction of side beam 12 is identical to that of side beam 14, the reference numerals utilized to describe side 14 will be affixed to side beam 12 with prime suffixes.

Thus, the description of side beam 14 is equally applicable to side beam 12. The side beam 14 is formed from an upper beam plate 38 and a lower beam plate 40. These beam plates 38 and 40 are formed from flat plate stock and are bent as shown in FIGURE 3. Vertical beam ribs 42 and 44 are formed from channel stock and are disposed between beam plates 38 and 40 and welded in place. The beam plates 38 and 40 and the beam ribs 42 and 44 form a rectangular frame at the center of the side beam 14. A horizontal beam member 46 formed of channel stock is placed within the frame and fixed to the upper beam plate 38 as shown in FIGURE 3. An axle housing 48 is rigidly secured to the beam plates 38 and 40, as by welding, at one end of the side beam 14. The internal dimension of housing 48 is such that the axle 18 passes through housing 48 with a press fit. At the other end of side beam 14, the universal axle support housing 50 is secured to beam plates 38 and 40 as by welding.

The universal axle support housing 50 nonrotatably retains a race 52 that has a spherical internal surface as best seen in FIGURE 2. Nonrotatably fixed to axle 16, as by a press fit, is a spherical bearing 54 which cooperates with the race 52 to form a universal axle supporting means. Thus from FIGURE 2 it may be seen that side beam 14 is rigidly and non-rotatably secured to axle 18 and universally supports axle 16. The side beam 12 rigidly secures axle 16 in axle housing 48', and universally supports axle 18 within the universal axle supporting housing 50'.

The side beam 14 may be provided with filler wedges 56 and 58 which snugly fit between beam plates 38 and 40 and the vertical beam ribs 42 and 44 and fill the spaces between channel 42 and axle housing 48 and between channel 44 and bearing housing 50 as shown in FIGURE 3.

FIGURE 5 shows in detail the frame formed by ribs 42 and 44 and beam plates 38 and 40 in the side beam 14. This frame is utilized to support the bolster beam means 32 as is shown in FIGURE 5. A lower support plate 60 is secured to the lower beam plate 40 by bolt 62 and nut 64. The resilient bolster supports 36 are formed from lower support sections 66 and upper support sections 68. Sections 66 and 68 are formed of resilient and deformable material. The sections 66 and 68 are bonded to spacer washers 76 as shown in FIGURE 5. The overall resilient bolster supports 36 are four in number, two disposed in each side beam 12 and 14. The resilient supports 36 are pinned to lower support plate 60 and upper support plate 70 by dowel pins 72. The upper support plate 70 has the bolster beams 32 resting upon its upper surface.

As best shown in FIGURE 4, the bolster beams 32 extend between the side beams 12 and 14 and rest upon the upper support plates 70 and 70' of the side beams 14 and 12 respectively. Pieces of angle stock which form spacer members 74 are fixed to the bolster beams 32 in any suitable manner to limit the movement of bolster beams 32 transversely of side beams 12 and 14. Thus, the bolster beams 32 are resiliently supported on the side beams so that the bolster beams may support the car bolster 34.

It will be appreciated that the resilient support means 36 supports the bolster beams 32 near the outboard portions of the bolster beams 32 to provide a high degree of stability to the bolster beam and therefore to provide stability to the railway car supported by bolster 34. Further, it has been found that the atmosphere of coal mines adversely effects metal spring means which may be utilized to support bolster beams 32. Thus, the rubber bolster supports 36 provide for a more durable and more effective support means for the bolster beams 32. The bolster support means 36 may also be fabricated more economically than metal spring means and are, therefore, of further advantage.

With the foregoing description of the structural details of the novel mine car truck in mind, the operation of the car truck and the advantages attendant thereto will become readily apparent. The side beams 12 and 14 and the axles 16 and 18 are maintained in perpendicular relationship to each other when viewed from the top of the car as in FIGURE 2. Axle 18 and side beam 14 are press fitted together so that there may be no relative movement between the two. Thus, the perpendicular relationship between the two may not be affected by any wear due to relative motion. In a like manner the side beam 12 and the axle 16 are press fitted together. Thus, the axles 16 and 18 are maintained in perpendicular relationship to the rails upon which the truck moves. Nevertheless, the universal supporting means 20 and 22 allow vertical movement of each individual wheel with respect to the other wheels. This vertical movement is permitted without destroying the perpendicular relationship of the axles 16 and 18 to the rails.

In FIGURE 1, the novel rail car truck is shown with the wheel 28 raised out of the plane in which the other three wheels 24, 26 and 30 are supported. The action of the parts of the rail car truck 10 which permit this raising of wheel 28 may be described with reference to FIGURE 1. To raise wheel 28, as for example if the rail upon which wheel 28 moved was high at the point over which wheel 28 was then passing, the end of axle 16 upon which wheel 28 is journaled for rotation must also raise. When the end of axle 16 raises, the end of side beam 14 which universally supports axle 16 also raises. Since there is a universal connection between axle 16 and side beam 14, the side beam 14 remains in its original vertical plane while the axle 16 moves upwardly out of its original horizontal plane so that the axle 16 is canted with respect to side beam 14 as shown in FIGURE 1. Since the side beam 14 is rigidly and nonrotatably fixed to axle 18, axle 18 rotates about its own axis to allow the end of side beam 14 supporting axle 16 to be raised. The rotation of axle 18 is permitted at the universal connecting means 22. Since axle 16 is rigidly and nonrotatably secured to side beam 12, the side beam 12 must cant out of its original vertical plane when the end of axle 16 upon which wheel 28 is journaled is raised. This canting action also takes place at universal connection 22. Thus, when wheel 28 is raised in a vertical direction, there is movement at the universal connection 22 about two different axes of the universal connection simultaneously. Since the axle 18 rotates about its own axis with respect to side beam 12 there is rotation about the axis of axle 18. Further, since the side beam 12 is canted out of its original vertical plane, there is rotation of side beam 12 about an axis parallel to the rails of the railway track and passing through the universal connecting means 22.

In the same manner there is motion between axle 16 and side beam 14 about two different axes of the universal connecting means 20 when wheel 28 is raised. Thus, there is relative motion about the axis of axle 16 since the side beam 14 pivots about axle 16. Further, since axle 16 moves out of its original horizontal plane, there is motion about an axis passing longitudinally through side beam 14.

If a wheel adjacent the press fitted connection between an axle and a side beam is raised, a similar action takes place at the universal connecting means 20 and 22. For example, if wheel 24 which is adjacent the press fitted connection between side beam 14 and axle 18 were raised vertically, the end of axle 18 as well as the end of side beam 14 would be raised. Thus, the side beam 14 would cant out of its original vertical plane about universal connecting means 20 and would also pivot about axle 16 at universal connecting means 20. Further, the side beam 12 would remain in its original vertical plane and the axle 18 would cant with respect to side beam 12 and connecting means 22.

In spite of this freedom of vertical movement of the individual wheels, the overall axle and side beam construction, when viewed from the top as in FIGURE 2, insures that the axles 16 and 18 are maintained perpendicular to the side beams 12 and 14 under all conditions. Because of the rigid connections at 48 and 48', no parallelogram effect may allow movement of axles 16 and 18 out of perpendicular alignment with the rails.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. A rail car truck comprising first and second longitudinally extending side beams having forward and rear end portions, a first universal axle supporting means fixed to said first side beam forward end portion, a second universal axle supporting means fixed to said second side beam rear end portion, a first axle non-rotatably and rigidly fixed to said second side beam forward end portion and universally supported by said first universal axle supporting means, said first universal axle supporting means being axially aligned with the axis of said first axle, a second axle non-rotatably and rigidly fixed to said first side beam rear end portion and universally supported by said second universal axle supporting means, said second universal axle supporting means being axially aligned with the axis of said second axle, and four flanged wheels journaled for rotation upon the ends of said axles outboard of said side beams.

2. A rail car truck comprising first and second longitudinally extending side beams having forward and rear end portions, spring means fixed to each of said side beams, bolster beam means extending transversely of said side beams and supported by said spring means, a first universal axle supporting means fixed to said first side beam forward end portion, a second universal axle supporting means fixed to said second side beam rear end portion, a first axle non-rotatably and rigidly fixed to said second side beam forward end portion and universally supported by said first universal axle supporting means, said first universal axle supporting means being axially aligned with the axis of said first axle, a second axle non-rotatably and rigidly fixed to said first side beam rear end portion and universally supported by said second universal axle supporting means, said second universal axle supporting means being axially aligned with the axis of said second axle, and four flanged wheels journaled for rotation upon the ends of said axles outboard of said side beams.

3. The rail car truck of claim 2 wherein said spring means are formed from solid pieces of rubber.

4. A rail car truck comprising first and second longitudinally extending side beams having forward and rear end portions, each of said side beams including an upper beam plate and a lower beam plate extending longitudinally in spaced relation and connected by vertical beam ribs, said beam plates and said beam ribs forming a rectangular frame within each of said side beams, a horizontal beam member fixed to each of said upper beam plates within said rectangular frames, solid resilient means fixed to said lower beam plates within each of said rectangular frames, transverse bolster beam means extending through said rectangular frames and supported at each end by said spring means, spacer means fixed to said bolster beam means and coacting with said horizontal beam members to limit movement of said bolster beam means transversely of said side beams, a first universal axle supporting means fixed to said first side beam forward end portion, a second universal axle supporting means fixed to said second side beam rear end portion, a first axle non-rotatably and rigidly fixed to said second side beam forward end portion and universally supported by said first universal axle supporting means, said first universal axle supporting means being axially aligned with the axis of said first axle, a second axle non-rotatably and rigidly fixed to said first side beam rear end portion and universally supported by said second universal axle supporting means, said second universal axle supporting means being axially aligned with the axis of said second axle, and four flanged wheels journaled for rotation upon the ends of said axles outboard of said side beams.

References Cited in the file of this patent

UNITED STATES PATENTS

| | | |
|---|---|---|
| 548,807 | Mansfield | Oct. 29, 1895 |
| 601,270 | Maris | Mar. 29, 1898 |
| 1,151,693 | Lamont | Aug. 31, 1915 |
| 1,157,832 | Baver | Oct. 26, 1915 |
| 1,654,326 | Fowler | Dec. 27, 1927 |
| 1,813,706 | Lewis | July 7, 1931 |
| 1,924,237 | Glascodine | Aug. 29, 1933 |
| 2,286,608 | Eksergian | June 16, 1942 |
| 2,638,058 | Williams | May 12, 1953 |
| 2,754,768 | Hile | July 17, 1956 |
| 2,865,307 | Miller | Dec. 23, 1958 |